United States Patent
Cho et al.

(10) Patent No.: US 9,432,853 B2
(45) Date of Patent: Aug. 30, 2016

(54) POSITIONING DEVICE OF MOBILE COMMUNICATION TERMINAL, METHOD FOR CONSTRUCTING WIRELESS LAN INFORMATION OF DEVICE, POSITIONING SERVER OF MOBILE COMMUNICATION TERMINAL, AND METHOD FOR DRIVING SERVER

(75) Inventors: Chae Hwan Cho, Gwacheon Si (KR); Chang Seok Lee, Seoul (KR); Suk Yon Kang, Seoul (KR); Hye Min Lee, Seongnam-si (KR); Seung Yoon Baek, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 291 days.

(21) Appl. No.: 13/808,942

(22) PCT Filed: Jun. 28, 2011

(86) PCT No.: PCT/KR2011/004713
§ 371 (c)(1),
(2), (4) Date: Mar. 22, 2013

(87) PCT Pub. No.: WO2012/005469
PCT Pub. Date: Jan. 12, 2012

(65) Prior Publication Data
US 2013/0188508 A1    Jul. 25, 2013

(30) Foreign Application Priority Data
Jul. 9, 2010    (KR) .................... 10-2010-0066171

(51) Int. Cl.
| H04L 12/16 | (2006.01) |
| H04W 24/00 | (2009.01) |
| G01S 5/04 | (2006.01) |
| G01S 5/14 | (2006.01) |
| H04W 64/00 | (2009.01) |
| H04L 29/08 | (2006.01) |

(52) U.S. Cl.
CPC .............. *H04W 24/00* (2013.01); *G01S 5/04* (2013.01); *G01S 5/14* (2013.01); *H04L 67/18* (2013.01); *H04W 64/00* (2013.01)

(58) Field of Classification Search
CPC ........................................................ G01S 5/04
See application file for complete search history.

(56) References Cited

U.S. PATENT DOCUMENTS

| 2005/0241003 A1* | 10/2005 | Sweeney et al. ................ 726/28 |
| 2009/0059879 A1* | 3/2009 | Yamaoka et al. ............. 370/338 |
| 2012/0115508 A1* | 5/2012 | Moeglein et al. ......... 455/456.1 |

FOREIGN PATENT DOCUMENTS

| KR | 10-2006-0039803 | 5/2006 |
| KR | 10-2009-0095773 | 9/2009 |

(Continued)

OTHER PUBLICATIONS

International Search Report mailed Feb. 24, 2012 for PCT/KR2011/004713, citing the above references.

*Primary Examiner* — Huy D Vu
*Assistant Examiner* — Kevin Cunningham
(74) *Attorney, Agent, or Firm* — Hauptman Ham, LLP

(57) ABSTRACT

Embodiments of the disclosure concern a mobile terminal positioning apparatus, method for establishing wireless LAN information of the apparatus, mobile terminal positioning server, and method for operating the server wherein mobility of access point is determined by using positioning information provided at the request of mobile terminal positioning, updating wireless LAN information in wireless LAN server based on stationary access point to make it available to providing mobile terminal positioning service. Exemplary positioning apparatus includes access point for performing local wireless communications; node information-based server for managing wireless environment information of a node in charge of the mobile terminal communications; wireless LAN server; positioning server for calculating distance between the access point and node or between access point and mobile terminal, and if a certain distance is exceeded, determining the access point to be transportable and deletable, and providing the positioning result on stationary access point basis.

9 Claims, 7 Drawing Sheets

(56) References Cited

FOREIGN PATENT DOCUMENTS

| KR | 10-2010-0021747 | 2/2010 |
| KR | 10-2010-0060114 | 6/2010 |
| WO | 2005004527 A1 | 1/2005 |

* cited by examiner

POSITIONING DEVICE OF MOBILE COMMUNICATION TERMINAL, METHOD FOR CONSTRUCTING WIRELESS LAN INFORMATION OF DEVICE, POSITIONING SERVER OF MOBILE COMMUNICATION TERMINAL, AND METHOD FOR DRIVING SERVER

TECHNICAL FIELD

The present disclosure relates in some aspects to an apparatus for positioning a mobile communication terminal, a method for establishing wireless LAN information of the apparatus, a positioning server of a mobile communication terminal, and a method for operating the positioning server. More particularly, the present disclosure relates to an apparatus for positioning a mobile communication terminal, a method for establishing wireless LAN information of the apparatus, a positioning server of a mobile communication terminal, and a method for operating the positioning server, wherein mobility is determined on access points by using positioning information provided at the request of mobile terminal positioning, related information is deleted for the access points determined as having the mobility from wireless LAN information stored in a wireless LAN server, whereby updating the wireless LAN information based on stationary access points to make it available to providing mobile terminal positioning service.

BACKGROUND

The statements in this section merely provide background information related to the present disclosure and may not constitute prior art.

With the rapid development of electronic and communication technologies, a variety of wireless communication services based on wireless networks have been provided. Accordingly, services provided by mobile communication systems based on wireless communication networks have evolved from voice services to multimedia services that transmit various data such as packet data.

Among a variety of wireless Internet services using mobile communication terminals, a location based service (LBS) has attracted much attention due to the wide application and convenience thereof. LBS is a communication service that determines a location of a mobile communication terminal, such as a portable phone and a personal digital assistant (PDA), and provides additional information related to the determined location.

Positioning technologies for providing the LBS may be classified into a network based positioning technology, a handset based positioning technology, and a hybrid positioning technology. Specifically, the network based positioning technology detects a location by way of software using a radiowave environment, which is a cell radius of a base station in a mobile communication network, in order to determine a location of a mobile communication terminal. The handset based positioning technology uses a Global Positioning System (GPS) receiver mounted on a mobile communication terminal in order to determine a location of a mobile communication terminal. The hybrid positioning technology is a combination of the network based positioning technology and the handset based positioning technology.

Among these positioning technologies, the network based positioning technology is widely used in a shadow region where the GPS radiowave does not propagate. However, the positioning performance of the network based positioning technology may be degraded by relay environments or the like. In addition, since base stations are not densely installed, the network based positioning technology may not accurately determine the locations.

On the other hand, as bridge-type transportable access points, such as Egg of KT, are gradually distributed, positioning error is caused in the handset based positioning technology. That is, the accurate positioning of the access points based on the handset based positioning technology is not achieved, resulting in degradation in the reliability of the positioning.

DISCLOSURE

Technical Problem

One or more embodiments of the present disclosure are directed to provide a positioning apparatus of a mobile communication terminal, a method for establishing wireless LAN information of the apparatus, a positioning server of a mobile communication terminal, and a method for operating the positioning server, in which wireless LAN information of access points are collected by using a mobile vehicle or the like and are stored in a database, the database is updated on stationary access point basis by using positioning information provided at the request of positioning the mobile communication terminal, and a positioning service is provided by using the updated wireless LAN information.

SUMMARY

An embodiment of the present disclosure provides an apparatus for positioning a mobile communication terminal, including: an access point for performing wireless local area network (WLAN)/wireless personal area network (WPAN) communications with a mobile communication terminal; a node information-based server for managing wireless environment information of a node in charge of the communications of the mobile communication terminal; a wireless LAN server including a database storing wireless LAN information of the access point; and a positioning server for calculating a distance between the access point and the node or between the access point and the mobile communication terminal by using positioning information received when the positioning is requested to the mobile communication terminal, the wireless LAN information, and the wireless environment information, and if the calculated distance is greater than or equal to a predetermined distance, determining the access point to be transportable, clearing the access point from the database, and providing the result of positioning based on one or more stationary access points stored in the database when a positioning service is provided.

Another embodiment of the present disclosure provides a positioning server of a mobile communication terminal, including: a memory unit for storing wireless LAN information of an access point performing local wireless communications with a mobile communication terminal, wireless environment information of a node in charge of the communications of the mobile communication terminal, and positioning information received at the request of positioning the mobile communication terminal, and storing a comparative value for comparing a distance between the mobile communication terminal and the access point or between the access point and the node; a calculation unit for calculating the distance between the mobile communication terminal and the access point by using the positioning information and the wireless LAN information, and calculating the distance between the access point and the node by using the wireless LAN information and the wireless environment information; and a mobility determination unit for determining whether or not pieces of the information of the access point respectively included in the positioning information and the wireless LAN information are matched with each other, comparing the distance with the comparative value if match is made, and deleting the information of the access point included in the positioning information from the wireless LAN information when the distance is greater than or equal to the comparative value.

Still another embodiment of the present disclosure provides a method for establishing wireless LAN information of a positioning apparatus of a mobile communication terminal, including: collecting wireless LAN information of access points for performing local wireless communications with a mobile communication terminal, and storing the collected wireless LAN information in a database; requesting the mobile communication terminal to perform positioning and receiving positioning information; requesting for wireless environment information of a node in charge of the communications of the mobile communication terminal and receiving the wireless environment information; determining possible matches through comparison between pieces of the information of the access points included respectively in the wireless LAN information and the positioning information; calculating a distance between the mobile communication terminal and an access point or between the mobile communication terminal and the access point by using the positioning information, the wireless LAN information, and the wireless environment information, when the pieces of the information of the access points are matched with each other; determining whether or not the distance is greater than or equal to a comparative value prestored in a memory by comparing the distance with the comparative value; and deleting the information of the access point included in the positioning information from the wireless LAN information stored in the database, when the distance is determined to be greater than or equal to the comparative value.

Yet another embodiment of the present disclosure provides a method for operating a positioning server of a mobile communication terminal, including: storing wireless LAN information of an access point for performing local wireless communications with a mobile communication terminal, wireless environment information of a node in charge of the communications of the mobile communication terminal and positioning information received at the request of positioning the mobile communication terminal, and storing a comparative value for comparing a distance between the mobile communication terminal and the access point or between the access point and the node; calculating the distance between the mobile communication terminal and the access point by using the positioning information and the wireless LAN information, and calculating the distance between the access point and the node by using the wireless LAN information and the wireless environment information; and controlling to determine whether or not pieces of the information of the access point respectively included in the positioning information and the wireless LAN information are matched with each other, compare the distance with the comparative value if match is made, and thereby delete the information of the access point included in the positioning information from the wireless LAN information when the distance is greater than or equal to the comparative value.

ADVANTAGEOUS EFFECTS

According to the present disclosure as described above, wireless LAN information prestored in a wireless LAN server is updated based on stationary access point by using positioning information provided at the request of positioning the mobile communication terminal, and the wireless LAN information is used for the positioning of the mobile communication terminal. Therefore, positioning error can be prevented from occurring by a mobile access point. The accuracy of the positioning is improved as is the resultant reliability.

DETAILED DESCRIPTION

Figure 1:
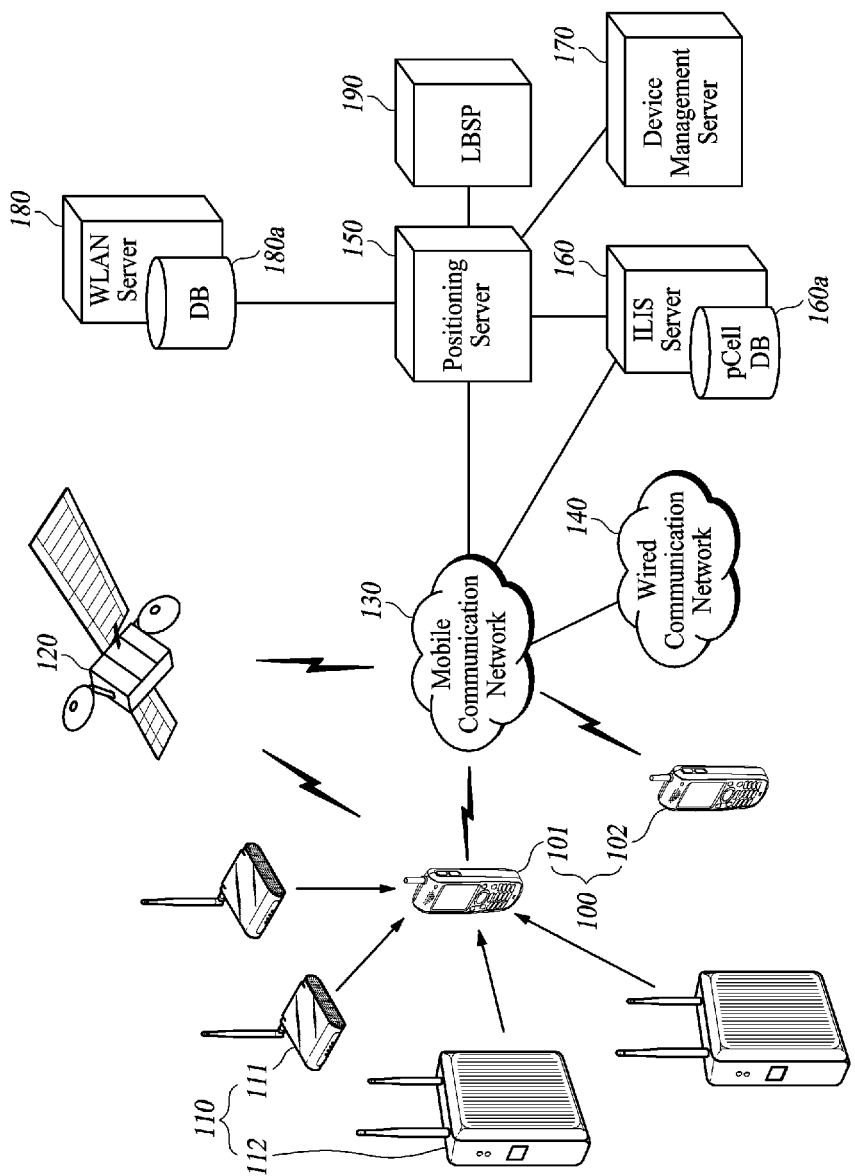
FIG. 1 is a diagram showing an apparatus for positioning a mobile communication terminal according to one or more embodiments of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
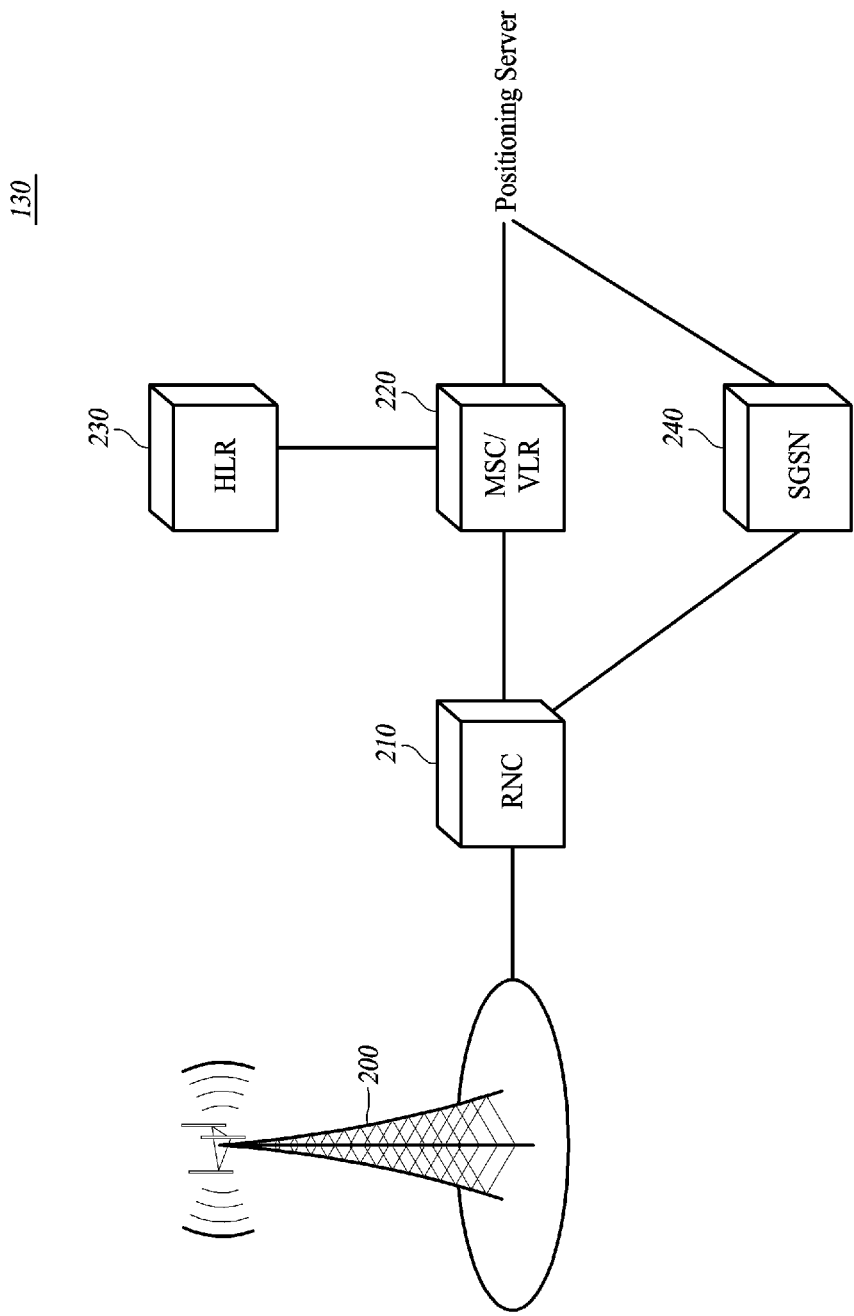
FIG. 2 is an exemplary diagram of the mobile communication terminal of FIG. 1.
Figure 3:
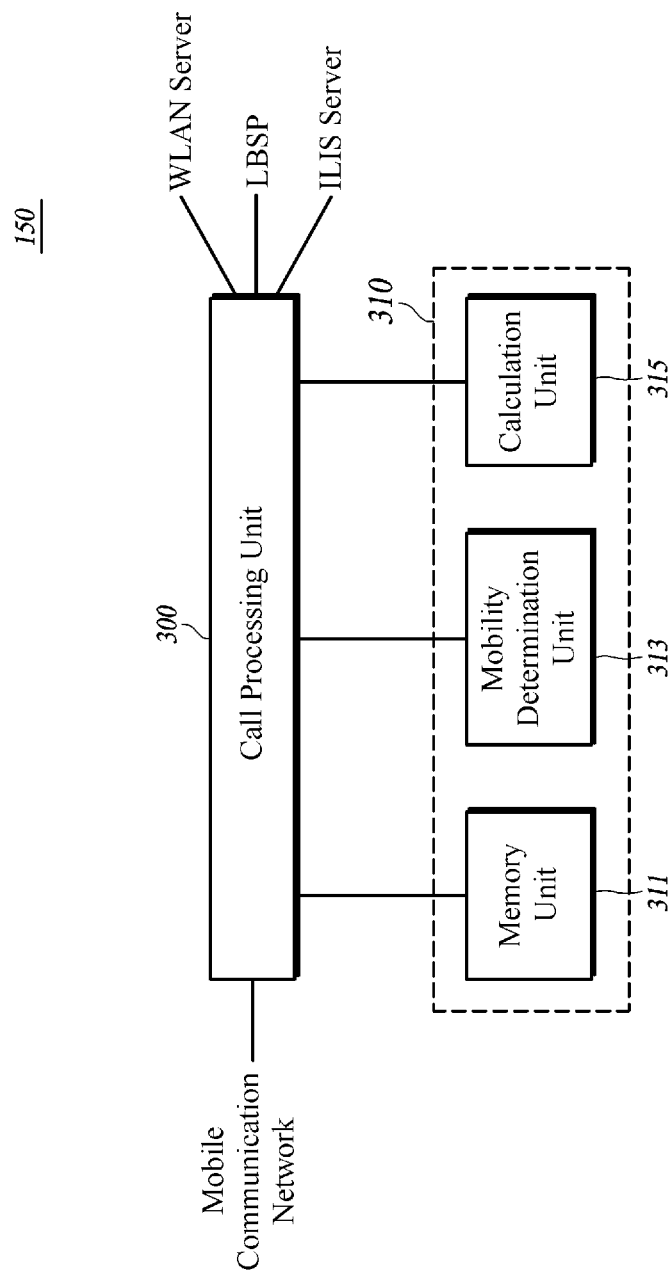
FIG. 3 is a diagram showing a configuration of a positioning server of FIG. 1.
Figure 4:
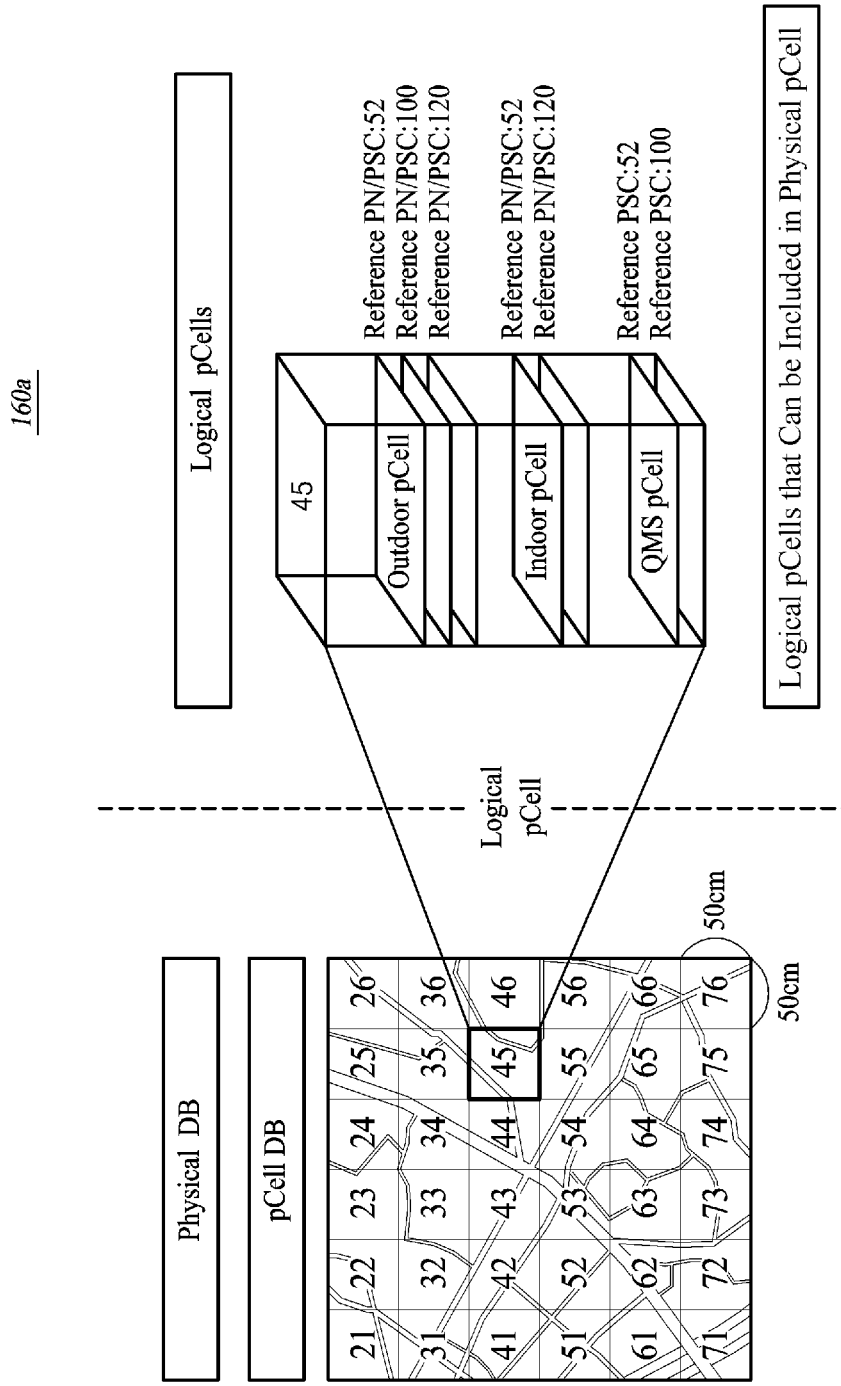
FIG. 4 is a diagram showing a pCell DB structure of FIG. 1.
Figure 5:
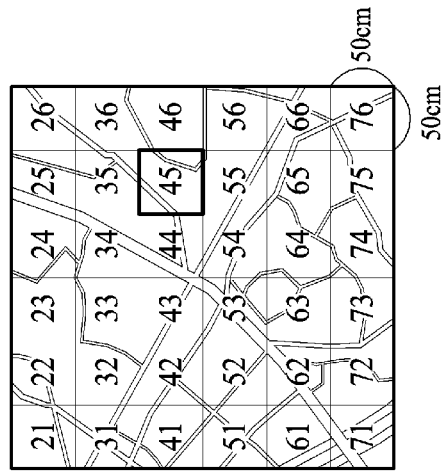
FIG. 5 is a diagram showing a DB structure of a WLAN server of FIG. 1.

FIG. 1 is a diagram showing an apparatus for positioning a mobile communication terminal according to one or more embodiments of the present disclosure. FIG. 2 is an exemplary diagram of the mobile communication terminal of FIG. 1. FIG. 3 is a diagram showing a configuration of a positioning server of FIG. 1. FIG. 4 is a diagram showing a pCell DB structure of FIG. 1. FIG. 5 is a diagram showing a DB structure of a WLAN server of FIG. 1.

As shown in FIGS. 1 to 5, a positioning apparatus for positioning a mobile communication terminal according to one or more embodiments of the present disclosure includes an access point 110 (hereinafter, referred to as an "AP"), a mobile communication network 130, a positioning server 150, node information-based servers 160 and 170, and a wireless LAN (WLAN) server 180. The positioning apparatus may further include a mobile communication terminal 100, a wired communication network 140, and an LBSP 190. The node information-based servers 160 and 170 may include Integrated LBS Indoor Solution Server (ILIS server) 160 and/or a device management server 170, which store and manage wireless environment information, such as base station information. The node information-based servers 160 and 170 may include various servers or devices as long as they can provide latitude and longitude coordinates of the base station.

In the embodiment of the present disclosure, the mobile communication terminal 100 may include a Personal Digital Assistant (PDA), a smartphone, a cellular phone, a Personal Communication Service (PCS) phone, a Global System for Mobile (GSM) phone, a Wideband CDMA (W-CDMA) phone, a CDMA-2000 phone, and a Mobile Broadband System (MBS) phone in order for applicability to various wireless/wired environments. The MBS phone refers to the mobile communication terminal 100 that is to be used in a next-generation system under discussion. In addition, the mobile communication terminal 100 according to the embodiment of the present disclosure may further include a Personal Computer (PC), a notebook computer, and the like.

The mobile communication terminal 100 includes a wireless communication module and/or a wireless LAN module, and may further include a GPS module. The mobile communication terminal 100 equipped with the wireless communication module connects to the mobile communication network 130 and performs voice communication and data communication with the other party. In addition, the mobile communication terminal 100 equipped with the wireless LAN module can connect to the wired communication network 140 through the recognized neighboring AP 100, and receive a variety of webpage data. Furthermore, the mobile communication terminal 100 may be classified into a GPS terminal 101 and a non-GPS terminal 102 depending on its equipment of a GPS module. The mobile communication terminal 100 equipped with the GPS module receives data provided through a GPS satellite 120.

The mobile communication terminal 100 connects to the Internet through the mobile communication network 130 by using Wireless Application Protocol (WAP) being Internet connection protocol, HTML-based Microsoft Internet Explorer (MIE) using HTTP protocol, Handheld Device Transport Protocol (HDPT), i-Mode of NTT DoKoMo, or a specific communication company's browser for wireless Internet connection. Among the Internet connection protocols used in the mobile communication terminal 100, the MIE uses m-HTML, which is an abbreviated modification of HTML. The i-Mode uses a language called compact HTML (c-HTML), which is a subset of HTML.

The mobile communication terminal 100, such as a recent smartphone, provides much faster wireless Internet by using a specific communication company's browser for wireless Internet connection, such as Opera Mini for i-Phone, or provides ultra-high speed wireless Internet by using the browser together with WiFi and Wibro (called WiMax), which are a local wireless communication network.

The mobile communication terminal 100 performs a network-based positioning or a handset-based positioning in response to a positioning request from the positioning server 150. For example, in order to perform the network-based positioning, the mobile communication terminal 100 may provide GPS information, base station information, and AP information to the positioning server 150 through the mobile communication network 130. When performing the network-based positioning, a positioning protocol message of a specific standard is used between the mobile communication terminal 100 and the positioning server 150. The positioning protocol is a standardized protocol of an application layer standard for positioning the mobile communication terminal 100.

For example, in the case of an asynchronous network (WCDMA), the GPS terminal 101 capable of receiving a GPS signal uses a Secure User Plane Location (SUPL) message to provide positioning information requested by the positioning server 150, for example, GPS information, base station information, and AP information, whereas the non-GPS terminal 102 incapable of receiving a GPS signal uses a Positioning Calculation Application Part (PCAP) message to provide positioning information requested by the positioning server 150, for example, GPS information, base station information, and AP information. On the other hand, in the case of a synchronous network (CDMA), the GPS terminal 101 uses an Interim Standard-801 (IS-801) message to provide positioning information to the positioning server 150, and the non-GPS terminal 102 uses a Pilot Strength Measurement (PSM) message to provide positioning information to the positioning server 150. Since the GPS terminal 101 can use a variety of positioning protocols, such as Radio Resource Location Services Protocol (RRLP) or Radio Resource Control (RRC), as well as SUPL and IS-801, there is no special limitation to the positioning protocol.

In the case of the synchronous network, the positioning information provided by the GPS terminal 101 to the positioning server 150 through the IS-801 message includes system information being currently serviced, a pilot signal of a neighboring base station, signal strength (Ec/Io), and the like. The system information includes, for example, System ID (SID), Network ID (NID), Base Station ID (BSID), base station sector number (Ref_PN) being currently serviced, pilot phase within Ref_PN, signal strength, and the like. In addition, the pilot signal of the neighboring base station includes a neighboring base station sector number (measurement PN) collected from the GPS terminal 101, a pilot phase within each neighboring base station sector number, signal strength, and the like. In the case of the asynchronous network, the positioning information provided by the GPS terminal 101 through the SUPL message may be Mobile Country Code (MCC), Mobile Network Code (MNC), UC-ID, Primary Scrambling Code (PSC), Received Signal Code Power (RSCP), signal strength (Ec/Io), observed time difference between System Frame Numbers (SFNs), or time difference between RX-TX of the GPS terminal 101. The embodiment of the present disclosure is not limited thereto, and may include positioning-related data used in any type of communication systems. The non-GPS terminal 102 provides positioning information, which is substantially identical to the positioning information provided by the GPS terminal 101, to the positioning server 150 through the PCAP message or the PSM message.

When the GPS terminal 101 performs positioning in response to the request from the positioning server 150 by using the SUPL or IS-801 message, the positioning message such as the SUPL message (hereinafter, referred to as a first positioning message) passes through the configuration of the mobile communication network 130 of FIG. 2, for example, network nodes such as a NodeB 200, an RNC 210, and an MSC/VLR 220, and is call-processed. On the other hand, when the non-GPS terminal 102 performs positioning by using the PCAP or PSM message, a positioning message such as the PCAP message (hereinafter, referred to as a second positioning message) passes through all the respective network nodes and is call-processed. Therefore, the first positioning message can be call-processed much faster than the second positioning message.

The AP 110 includes a small base station, such as a femto or pico base station, which is widely installed within a building. The femto or pico base station is classified depending on the maximum number of mobile communication terminals 100 that can be connected, in terms of the classification of the small base stations. In addition, the AP 110 includes a local wireless communication module for performing local wireless communication (such as WiFi) with the mobile communication terminal 100. In the embodiment of the present disclosure, the local wireless communication may be performed by Bluetooth communication, ZigBee communication, infrared communication (IrDA), Radio Frequency (e.g., Ultra High frequency (UHF) and Very High Frequency (VHF)) and Ultra Wideband (UWB) communication, as well as WiFi. Accordingly, the AP 110 may extract a position of a data packet, designate an optimal communication path to the extracted position, and transfer the data packet to a next device, for example, the mobile communication terminal 100, along the designated communication path. The AP 110 may share several communication lines in the general network environment, and include a router, a repeater, and a relay. In addition, the AP 110 may include a bridge product of a specific manufacturer, such as Egg of the Korean telecommunications company KT, or MiFi of Verizon of U.S.A.

The AP 110 is roughly classified into a stationary AP 111 and a transportable AP 112. The stationary AP 111 may include a router, a repeater, and a relay, and the transportable AP 112 may include a bridge product of the specific manufacturer, for example, Egg of KT. While ensuring the free mobility, the transportable AP 112 can read a receiver address of the mobile communication terminal 100 from transmitter information transmitted through the wired communication network 140, designates the optimal communication path, and transmits data through the designated communication path.

In FIG. 1, although the APs 110 are configured separately from the mobile communication network 130, the APs 110 may be included in the mobile communication network 130 in practice. Therefore, the embodiment of the present disclosure does not limit the APs 110 to the specific configuration.

In the case of the WCDMA network, as shown in FIG. 2, the mobile communication network 130 may include a relay (not shown), a NodeB 200, a Radio Network Controller (RNC) 210, a Mobile Switching Center (MSC)/Visitor Location Register (VLR) 220, and a Serving GPRS Support Node (SGSN) 240. The RNC 210 serves to relay a voice or data call between the NodeB 200 and the MSC/VLR 220 or between the NodeB 200 and the SGSN 240. The NodeB 200 and the RNC 210 in the WCDMA network are referred to as a Base Station Transmission System (BTS) and a Base Station Controller (BSC) in the CDMA network, respectively. In addition, in an Evolved Packet Core (EPC) network, the NodeB 200 and the RNC 210 may also be referred to as an evolved-NodeB (e-NodeB) and a Mobility Management Entity (MME), respectively. The MME is an integration of the RNC 210 and the MSC/VLR 220 in the WCDMA network and performs substantially the same functions as those of the RNC 210 and the MSC/VLR 220. Therefore, the mobile communication network 130 according to the embodiment of the present disclosure is not limited to the CDMA network, but may be a generic term for a GSM network, a Long Term Evolution (LTE) network, and the like.

For example, the NodeB 200 is arranged in units of cells. The NodeB 200 receives a call request signal from the mobile communication terminal 100 through a traffic channel among signal channels and transmits the received call request signal to the RNC 210 or performs a location registration to determine a location of the mobile communication terminal 100 existing in a cell coverage managed by the NodeB 200. In addition, the NodeB 200 is an endpoint device directly connected to the mobile communication terminal 100 and performs baseband signal processing, wireless/wired conversion, wireless signal transmission/reception, and the like. When the mobile communication terminal 100 existing in the cell coverage of the NodeB 200 belongs to a receiver, the NodeB 200 determines the location of the mobile communication terminal 100 and transmits the call request signal received from the MSC/VLR 220 through the RNC 210.

In addition, the NodeB 200 can obtain latitude and longitude information of the NodeB 200 by using the signal from the GPS satellite 120. The location information of the NodeB 200 can be transmitted to the mobile communication terminal 100 through a system parameter message of a forward link paging channel or may be transmitted to the device management server 170. The mobile communication terminal 100 can register new location information by calculating a moving distance of the mobile communication terminal 100 by using the location information of the NodeB 200 of the cell to which the mobile communication terminal 100 belongs. The location registration is a process of notifying the MSC/VLR 220 of the location, state, identifier, and slot period of the mobile communication terminal 100 and other features through the NodeB 200. When the NodeB 200 is to set a received signal to the mobile communication terminal 100, the mobile communication terminal 100 can be effectively called in the location registration process. The location registration of the mobile communication terminal 100 may be performed when the power of the mobile communication terminal 100 is turned on or off, when the mobile communication terminal 100 moves between the MSC/VLR 220, or when the parameters of the mobile communication terminal 100 are changed.

The RNC 210 controls the NodeB 200 and performs a wireless channel allocation and deallocation with respect to the mobile communication terminal 100, a transmission power control of the mobile communication terminal 100 and the NodeB 200, a decision of a soft handoff and a hard handoff between cells, transcoding and vocoding, GPS clock division, and operational and maintenance functions with respect to the NodeB 200. In addition, the RNC 210 transmits subscriber information of the mobile communication terminal 100 with its location registered to the MSC/VLR 220. The RNC 210 transmits the call request signal, received from the mobile communication terminal 100 through the NodeB 200, to the MSC/VLR 220. On the other hand, the RNC 210 transmits the call request signal, received from the MSC/VLR 220, to the mobile communication terminal 100 through the NodeB 200.

The MSC/VLR 220 performs basic and additional service processing, subscriber's incoming and outgoing call processing, location registration procedure and handoff procedure processing, and interworking with other networks. For example, the MSC/VLR 220 of the IS-95/A/B/C system includes subsystems, such as an Access Switching Subsystem (ASS) for performing distributed call processing, an Interconnection Network Subsystem (INS) for performing concentrated call processing, a Central Control Subsystem (CCS) for managing centralization of operation and maintenance, and a Location Registration Subsystem (LRS) for performing storage and management of information on mobile subscribers. In addition, the MSC/VLR 220 for the 3G and 4G networks may include an Asynchronous Transfer Mode (ATM) switch. The ATM switch increases a transmission rate and an efficient use of communication lines by a packet transmission in units of cells. When the location registration of the mobile communication terminal 100 is performed through the NodeB 200 and the RNC 210, the MSC/VLR 220 temporarily stores subscriber information of the mobile communication terminal 100 in the MSC/VLR 220, and requests an HLR 230 to register the location of the mobile communication terminal 100.

The HLR 230 receives the location information of the mobile communication terminal 100 from the MSC/VLR 220, and performs registration recognition, registration deletion, location check, and the like. In addition, the HLR 230 stores profile information of the mobile communication terminal 100 under state of call waiting. The profile information refers to Mobile Identification Number (MIN), Electronic Serial Number (ESN) and/or subscribed mobile communication service information of the mobile communication terminal 100. MSR/VLR 220 receives and stores visited subscriber's delivered information of site where the registration of positional information is carried out and subscriber data delivered as it is transmitted from the calling mobile communication terminal 100, received at the called mobile communication terminal 100, and the like. When the mobile communication terminal 100 performs the location information registration, the MSC/VLR 220 temporarily stores the subscriber information and notifies the HLR 230 of the information. The MSC/VLR 220 receives and manages copies of terminal identification number, terminal unique number, and service information from the HLR 230, and utilizes the received copies for location control, call processing, and external operation processing of the mobile communication terminal 100.

The SGSN 240 may include a Gateway GPRS Support Node (GGSN). For the purpose of General Packet Radio Service (GPRS) service, the SGSN 240 supports mobility management of the mobile communication terminal 100, session management for incoming/outgoing call processing and packet data transmission/reception processing, and authentication and billing functions. In addition, the SGSN 240 has a packet data routing processing function. The GGSN is a serving node of an IP-based packet network that provides a high-speed packet data service for GPRS. The GGSN performs session management and packet data routing processing for packet data service, and provides an interface connecting the mobile communication terminal 130 to the wired communication network 140, such as Internet network, and the GPRS is an asynchronous communication system that supports a data transmission rate of 384 Kbps, provides a multimedia mail, and maximizes the efficiency of a transmission line.

As shown in FIGS. 1 and 3, the positioning server 150 interworks with the mobile communication network 130, the ILIS server 160, the device management server 170, the WLAN server 180, and the LBSP 190. When receiving the positioning request from the LBSP 190, the positioning server 150 requests the positioning of the mobile communication terminal 100 in order for the handset-based positioning or the network-based positioning, receives GPS information, AP information and/or base station information as the positioning information from the mobile communication terminal 100, and determines mobility with respect to the respective APs 110 of wireless LAN information stored in the DB 180*a* of the WLAN server 180 by using wireless environment information, such as the received positioning information, the wireless LAN information provided from the WLAN server 180, and base station information provided from the node information-based servers 160 and 170.

In other words, in order to determine the mobility with respect to the respective APs 110 of the wireless LAN information stored in the DB 180*a* of the WLAN server 180, the positioning server 150 uses a first method of calculating a distance between the AP 110 and the NodeB 200 by using the base station information provided when the positioning of the mobile communication terminal 100 is requested, and the wireless LAN information of the AP 110 stored in the DB 180*a* of the WLAN server 180, and determining the mobility of the AP 110 according to the result value, or a second method of calculating a distance between the mobile communication terminal 100 and the AP 110 by using GPS positioning result of the mobile communication terminal 100 when the mobile communication terminal 100 succeeds in the GPS positioning, and determining the mobility of the AP 110 according to the result value or determining the mobility of the AP 110 by using only a difference of the GPS positioning results. The difference of the GPS positioning results refers to the other positioning information of the positioning information, based on the AP information of the positioning information provided as the GPS positioning result, for example, MAC address. If there are changes in latitude and longitude coordinates of the mobile communication terminal 100 after comparison, it is determined that there is a movement in the corresponding AP 110. This comparative information may be not GPS information but base station information, based on the AP information. The first method is classified into a method of calculating a distance between the AP 110 and the NodeB 200, based on the wireless environment information such as base station information provided from the ILIS server 160, and a method of calculating a distance between the AP 110 and the NodeB 200, based on the wireless environment information provided from the device management server 170. Since the ILIS server 160 can determine the latitude and longitude coordinates of the base station by using the neighboring base station information, it can obtain more accurate location information than the base station information provided by the device management server 170. When the base station information provided from the mobile communication terminal 100 after the positioning server 150 requests the positioning is single or base station information which is absent from the pCell DB 160*a* of the ILIS server 160, the mobility of the AP 110 can be determined by using the latitude and longitude coordinates of the NodeB 200 provided by the device management server 170. On the other hand, when the positioning information provided by the mobile communication terminal 100 is equal to or more than, say, three pieces, including the neighboring base station information, the mobility of the AP 110 can be determined by using the latitude and longitude coordinates of the base station 200 provided by the ILIS server 160.

When the plurality of APs 110 stored in the DB 180*a* of the WLAN server 180 are determined as the transportable AP 112 by using the wireless LAN information through the above-described procedure, the positioning server 150 requests the WLAN 180 to delete or clear the corresponding APs 110 and updates the DB 180*a* based on the stationary APs 111. If the specific AP 110 is deleted from the DB 180*a* of the WLAN server 180 just because of its single movement, the number of the APs 110 available for positioning is reduced. Therefore, the positioning server 150 according to the embodiment of the present disclosure may determine the number of continuous positional changes of the specific AP 110, request the deletion of the corresponding APs 110 according to the determination made, and update the DB 180a based on the stationary APs 111. For this purpose, the resultant number of movements occurred can be additionally stored in the DB 180a. As such, since the wireless LAN information stored in the DB 180a of the WLAN server 180 is constructed based on the stationary AP 111, the positioning server 150 may provide the positioning result, based on the GPS positioning result of the mobile communication terminal 100, at the service request of the service subscriber for the service such as "find friends". In addition, when in the GPS shadow region where the GPS signal is not received, the positioning server 150 may provide the positioning result based on the base station provided from the ILIS server 160. Furthermore, the positioning server 150 may provide the positioning result based on the AP information of the stationary AP 111 updated after being stored in the WLAN server 180.

In order to perform the above operation, as shown in FIG. 3, the positioning server 150 may include a call processing unit 300 and a transportable AP determination unit 310. The call processing unit 300 performs the call processing while interworking with the ILIS server 160, the device management server 170, the WLAN server 180, and the LBSP 190. In addition, the transportable AP determination unit 310 determines the mobility of the APs 110 stored in the WLAN server 180 as the wireless LAN information by using the positioning information of the communication terminal 100 under positioning request, which can be provided through the call processing unit 300, the wireless LAN information stored in the WLAN server 180, the wireless environment information of the node information-based servers 160 and 170, and updates the wireless LAN information stored in the WLAN server 180.

For example, the transportable AP determination unit 310 may include a memory unit 311, a mobility determination unit 313, and a calculation unit 315. The memory unit 311 receives and stores the positioning information from the mobile communication terminal 100 under positioning request, the wireless environment information of the NodeB 200 provided by the ILIS server 160 and the node information-based servers 160 and 170, and the wireless LAN information provided from the WLAN server 180. The wireless environment information may include latitude and longitude coordinates of the NodeB 200, and may include latitude and longitude coordinates of the AP 110. Furthermore, the memory unit 311 stores a comparative value that can compare whether or not a calculation value calculated by the calculation unit 315, that is, a distance between the NodeB 200 and the AP 100 or a distance between the mobile communication terminal 100 and the AP 110, is greater than or equal to a predetermined distance. The predetermined distance may represent a maximum communicable range where the NodeB 200 communicates with the mobile communication terminal 100. Since the predetermined distance may be differently set for each region, the embodiment of the present disclosure does not specially limit the predetermined distance.

The mobility determination unit 313 preferentially determines whether or not the MAC address of the AP 110 among the pieces of the positioning information stored in the memory unit 311 is matched with the MAC address stored in the wireless LAN information. If matched, the mobile determination unit 313 compares the distance calculation value provided by the calculation unit 315 with a prestored comparative value, and determines whether or not the distance calculation value is greater than or equal to the comparative value. As the comparison result, if the distance calculation value is greater than or equal to the comparative value, the mobility determination unit 313 provides the determination result to the WLAN server 180, such that the wireless LAN information of the corresponding AP 110 stored in the DB 180a is deleted.

The calculation unit 315 calculates the latitude and longitude coordinates of the mobile communication terminal 100 under positioning request from the GPS information stored in the memory unit 311, calculates a distance between the mobile communication terminal 100 and the AP 110 by using the latitude and longitude coordinates of the mobile communication terminal 100 and the latitude and longitude coordinates of the AP 110 stored in the memory unit 311, and provides the calculation value to the mobility determination unit 313. In addition, the calculation unit 315 calculates a distance between the AP 110 and the NodeB 200 by using the latitude and longitude coordinates of the AP 110 and the NodeB 200 stored in the memory unit 311, and provides the calculation value to the mobility determination unit 313.

For example, the information processed in the transportable AP determination unit of FIG. 3 is shown in Table 1 below. All pieces of the information shown in Table 1 below may be stored in the memory unit 311 of the positioning server 150. The wireless LAN information and the first base station information are information provided from the WLAN server 180, the second base station information is information provided by the node information-based servers 160 and 170, and the distance calculation value represents the resultant value calculated in the calculation unit 315 by using the latitude and longitude coordinates of the wireless LAN information and the latitude and longitude coordinates of the second base station information.

TABLE 1

| Wireless LAN Information | | | | First Base Station Information | | | | | Second Base Station Information | | Distance Calculation |
| --- | --- | --- | --- | --- | --- | --- | --- | --- | --- | --- | --- |
| MAC addr | Lat. | Long. | RSS | MCC | MNC | UC_ID | PSC | EC_NO | Lat. | Long. | Value |
| 11:22:34:0f:9s:aa | 128.434 | 72.343 | 80 | 450 | 05 | 100 | 101 | 70 | 128.435 | 72.349 | 300 m |
| 44:11:22:34:0f:92 | 128.434 | 72.344 | | | | | | | 128.434 | 72.349 | 50 m |
| 55:11:22:34:0f:aa | 128.434 | 72.345 | | | | | | | 128.434 | 72.349 | 6200 m |

TABLE 1-continued

| Wireless LAN Information | | | | First Base Station Information | | | | | | Second Base Station Information | | Distance Calculation Value |
|---|---|---|---|---|---|---|---|---|---|---|---|---|
| MAC addr | Lat. | Long. | RSS | MCC | MNC | UC_ID | PSC | EC_NO | | Lat. | Long. | |
| aa:22:34:0f:9s:aa | 128.434 | 72.346 | | | | | | | | 128.434 | 72.349 | 60 m |
| ... | | | | | | | | | | 128.434 | 72.349 | ... |

For example, after calculating the distance by using the respective latitude and longitude coordinates of the AP 110 and the NodeB 200, if the calculation value such as 6,200 m exists as shown in Table 1 above, it may be determined as representing not the initially installed location of the AP 110 but the movement of the AP 110.

If the comparative value stored in the memory unit 311 is 300 m, the mobility determination unit 313 compares the distance calculation value of 6,200 mm with the comparative value. If it is determined that the corresponding AP 110 has moved, the wireless LAN information of the corresponding AP 110 stored in the DB 180a of the WLAN server 180 is deleted, and the DB 180a of the WLAN server 180 is updated based on the stationary AP 111.

As shown in FIG. 4, the ILIS server 160 further includes a pCell DB 160a used for pCell positioning. The pCell DB 160a stores grid cells which are divided by each pCell ID with the positioning result data generated from each positioning operation assuming basic data. The grid cells are cells obtained by dividing a specific region by a preset size. The grid cells include a pCell ID based on a base station sector number (reference PN) and a Primary Scrambling Code (PSC) of the NodeB 200 disposed at the specific location. For example, the grid cells may be set to 100×100, 50×50, 30×30, 25×25, 20×20, 10×10, 5×5 and such. Reference data capable of representing basic data may also be stored together with such basic data. The reference data are data to be compared considering pattern matching during the pCell positioning, greatly influencing the positioning accuracy, and they undergo updating when the pCell DB 160a is updated. The pCell DB 160a of the ILIS server 160 defines the positioning result data at each cell. The respective cells further include system information being currently serviced, a pilot signal of a neighboring base station, signal strength (Ec/Io). As described above, the system information being currently serviced includes an SID, an NID, a BSID, a Ref_PN, a pilot phase within the Ref_PN, and signal strength.

The pCell DB 160a refers to a general data structure implemented in a storage space (hard disk or memory) of a computer system using a database management program (DBMS). The pCell DB 160a refers to a type of data storage that can freely search or extract, delete, edit, and add data. The pCell DB 160a may be implemented to achieve the object of one embodiment of the present disclosure by using a relational database management system (RDBMS), such as Oracle, Infomix, Sybase, and DB2, an object-oriented database management system (OODBMS), such as Gemston, Orion, and O2, and an XML native database, such as Excelon, Tamino, and Sekaiju. The pCell DB 160a includes appropriate fields or elements so as to achieve its own function.

The device management server 170 manages a Base Station Almanac (BSA) for managing the operating equipment of the mobile communication network 130. That is, the device management server 170 stores the wireless environment information of the plurality of NodeBs 200 and the relay managing the plurality of NodeBs 200, and may provide the corresponding wireless environment information at the request from the positioning server 150. In addition, when there occurs a change in accepting the NodeB 200, the device management server 170 stores the wireless environment information, such as the base station information, according to the change of the NodeB 200.

The WLAN server 180 includes the DB 180a that stores the wireless LAN information of the AP 110 of FIG. 1. As shown in FIG. 5, the DB 180a may be divided into a primary DB and a secondary DB. The primary DB represents a DB in which the wireless LAN information, such as the locations of the APs 110 previously installed over the entire regions, is collected by using a mobile vehicle or the like, without discrimination between the stationary type and the transportable type, and the collected wireless LAN information is matched into the grid cells divided on the pCell ID basis. The secondary DB represents a DB in which the wireless LAN information of the primary DB is processed and organized in a table form while distinguishing the wireless LAN information on MAC address basis. In this manner, the amount of the wireless LAN information of the APs 110, constructed in the primary DB and the secondary DB, may be adjusted to increase or decrease according to the time point at which the wireless LAN information is established. The WLAN server 180 updates the primary and secondary DBs, based on the stationary APs 111, by deleting the related information of the transportable APs 112 among the corresponding APs 110 stored in the primary and secondary DBs as the wireless LAN information in response to the request from the positioning server 150. Then, when there is the request from the positioning server 150, the positioning result is provided based on the stationary APs 111.

Figure 6:
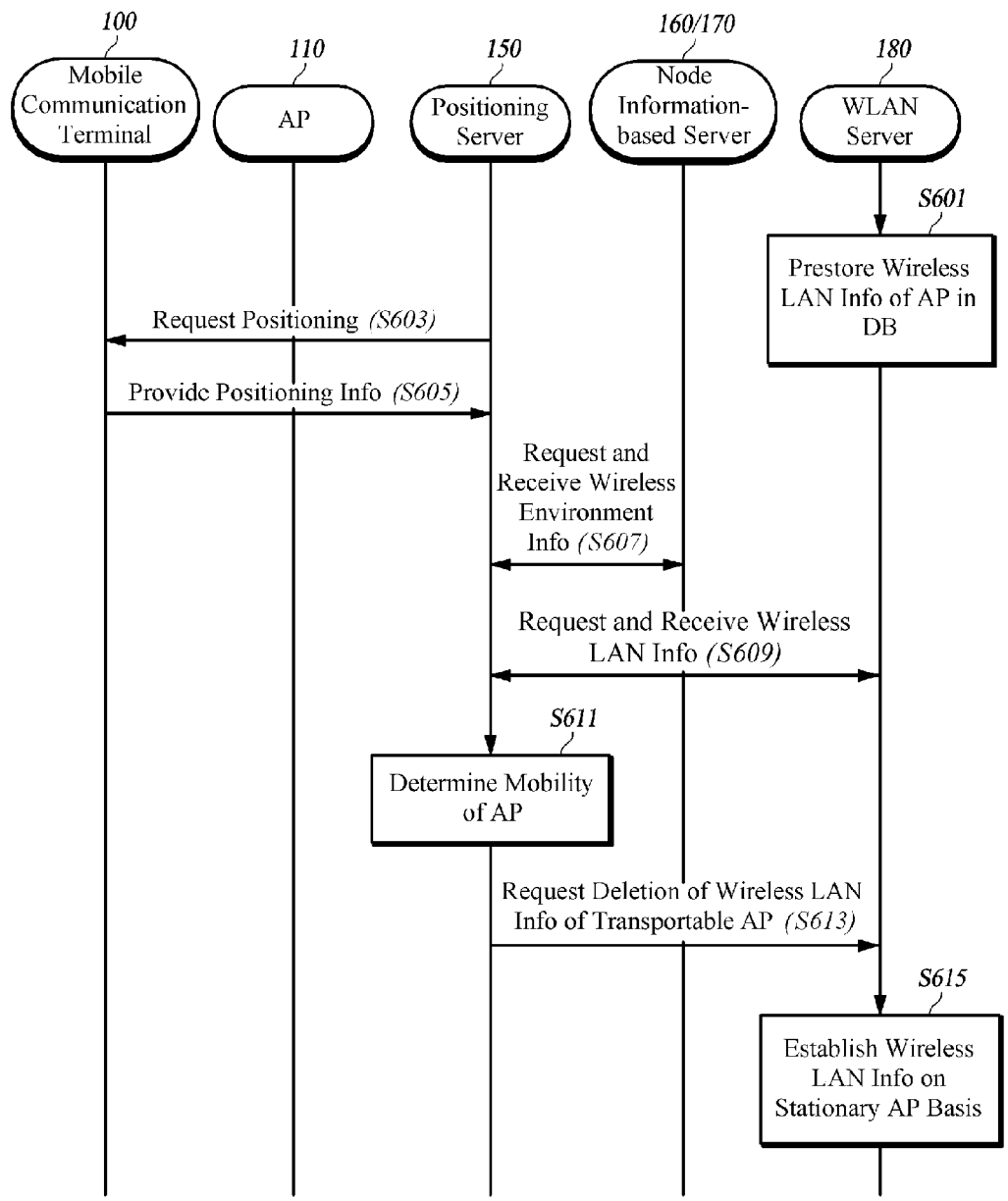
FIG. 6 is a diagram showing a process of establishing wireless LAN information of the apparatus for positioning the mobile communication terminal which is shown in FIG. 1.

FIG. 6 is a diagram showing a process of establishing the wireless LAN information of the apparatus for positioning the mobile communication terminal shown in FIG. 1.

Referring to FIGS. 1 to 3 and 6 together, the WLAN server 180 first collects wireless LAN information of the APs 110 previously installed over the entire regions and prestores the collected wireless LAN information (S601). This process may collect the wireless LAN information of the APs 110 previously installed over the entire regions by performing local wireless communications by using a mobile vehicle, and the amount of the prestored wireless LAN information is adjusted to increase or decrease according to the time point at which the wireless LAN information is collected.

The positioning server 150 requests the mobile communication terminal 100 to perform the positioning (S603). The mobile communication terminal 100 may be provided with a wireless LAN module and/or a GPS module.

The mobile communication terminal 100 drives the wireless LAN module and GPS module to perform communication in response to the positioning request from the positioning server 150, and provides the positioning server 150 with GPS information, AP information and/or base station information, which are collected as the positioning information (S605).

The positioning server 150 requests wireless environment information, such as base station information, to the node information-based servers 160 and 170, such as the ILIS server 160 and the device management server 170, and receives wireless environment information from the node information-based servers 160 and 170 (S607).

In addition, the positioning server 150 requests wireless LAN information to the WLAN server 180, and receives the wireless LAN information from the WLAN server 180 (S609).

The positioning server 150 may receive information after requesting wireless LAN information earlier than the wireless environment information. Before the request for positioning the mobile communication terminal 100, the positioning server 150 may make an advance request and receive the wireless environment information and wireless LAN information, and then, store the received information in the separate memory unit 311. Therefore, the embodiment of the present disclosure would not limitedly adhere to this specific sequence.

The positioning server 150 determines the mobility of the APs 110 by using the positioning information from the mobile communication terminal 100, the wireless environment information from the node information-based servers 160 and 170, and the wireless LAN information from the WLAN server 180 (S611).

The mobility determination of the APs 110 is to determine mobility with respect to the APs 110 prestored in the DB 180*a* of the WLAN server 180. For this purpose, after the positioning request, the AP information of the positioning information from the mobile communication terminal 100 is used.

In other words, the AP information provided as the positioning information, for example, the MAC address of the AP 110, is compared with the MAC address of the AP 110 prestored in the DB 180*a* of the WLAN server 180. When the two MAC addresses are matched with each other, a distance between the NodeB 200 and the AP 110 is calculated by using the wireless environment information of the corresponding AP 110 and the wireless LAN information. When the distance is outside of a predetermined range, it is determined that the AP 110 has moved. In this case, the distance is calculated by using the latitude and longitude coordinates of the NodeB 200 included in the wireless environment information, and the latitude and longitude coordinates of the AP 110 included in the wireless LAN information.

The wireless environment information, such as the base station information, may have different latitude and longitude coordinates provided from the ILIS server 160 or the device management server 170 constituting the node information-based servers 160 and 170. The latitude and longitude coordinates from the ILIS server 160 are measured considering also a plurality of pieces of base station information provided as the positioning information, for example, neighboring base station information. This would make the latitude and longitude coordinates more accurate than the latitude and longitude coordinates offered by the device management server 170.

As another method, in order to determine the mobility of the APs 110, the positioning server 150 can calculate the distance between the mobile communication terminal 100 and the AP 110 by using the latitude and longitude coordinates of the mobile communication terminal 110 calculated from the GPS information provided as the positioning information, and the latitude and longitude coordinates of the AP 110 provided as the wireless LAN information.

Then, the positioning server 150 may compare the distance calculation value with the comparative value prestored in the memory unit 311, and determine the mobility of the APs 110, that is, the APs prestored in the DB 180*a* of the WLAN server 180 as the wireless LAN information.

After determining the mobility of the APs in the above-described manner, the positioning server 150 requests to delete the wireless LAN information of the APs 110, whose mobility is determined, from the DB 180*a* of the WLAN server 180 (S613).

Then, the WLAN server 180 updates the wireless LAN information prestored in the DB 180*a*, based on the stationary APs 111, by deleting the wireless LAN information of the corresponding APs 110 from the DB 180*a*.

Then, when there is the request from the service subscriber, the positioning server 150 may use the wireless LAN information as one method of providing the positioning result.

As another method of providing the positioning result when there is the request form the service subscriber, the positioning server 150 may provide the GPS information as the positioning result if the mobile communication terminal can receive the GPS signal. When the GPS signal cannot be received, the positioning server 150 may provide the positioning result by using the pattern matching of the pCell stored in the ILIS server 160.

Figure 7:
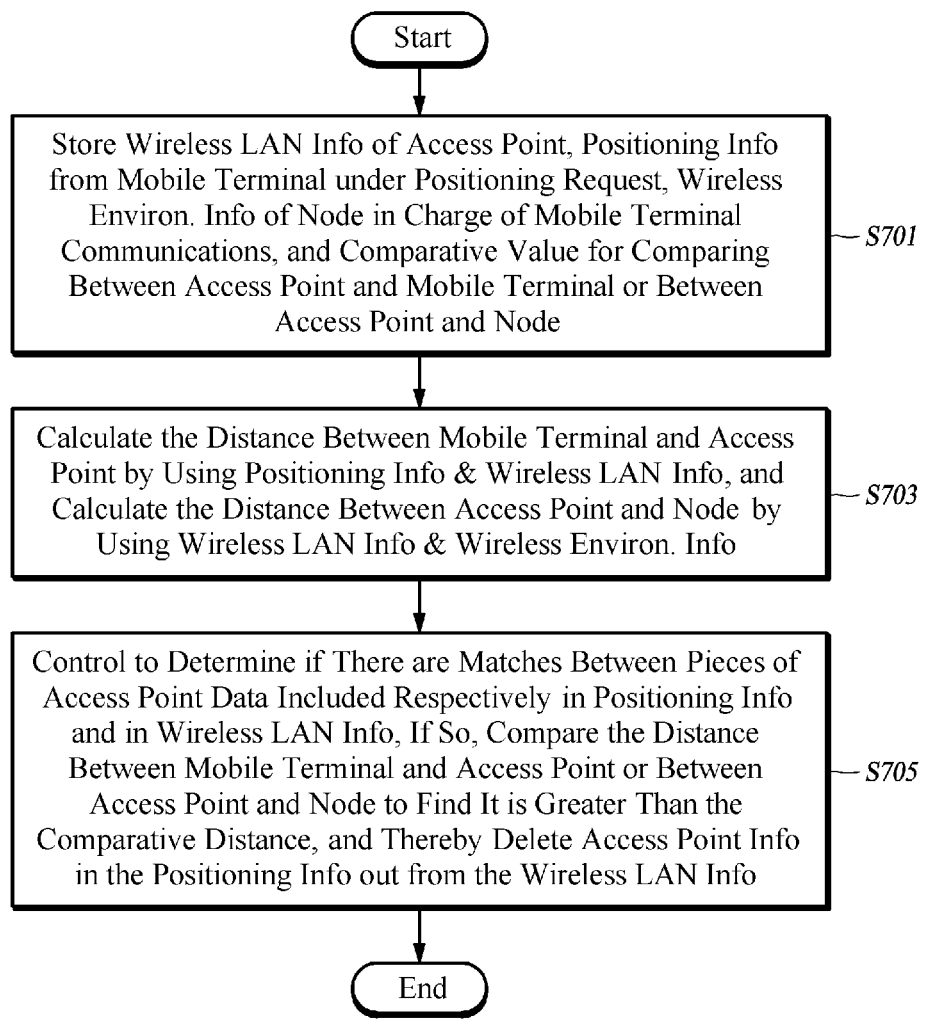
FIG. 7 is a diagram showing a method for driving a positioning server of FIG. 1.

FIG. 7 is a diagram showing a method for driving the positioning server of FIG. 1.

Referring to FIGS. 1, 3 and 7, the positioning server 150 stores the wireless LAN information of the APs 110, the positioning information from the mobile communication terminal 100 under positioning request, and the wireless environment information of the NodeB 200 in charge of the communication of the mobile communication terminal 100 in the memory unit 311, and stores a comparative value for comparing a distance between the AP 110 and the NodeB 200 or a distance between the AP 110 and the mobile communication terminal 100 in the memory unit 311 (S701).

In addition, the positioning server 150 calculates the distance between the mobile communication terminal 100 and the AP 110 by using the positioning information and the wireless LAN information, or calculates the distance between the AP 110 and the NodeB 200 by using the wireless LAN information and the wireless environment information (S703).

In this case, the distance between the mobile communication terminal 100 and the AP 110 is calculated by using the latitude and longitude coordinates of the mobile communication terminal 100 calculated by the positioning information, and the latitude and longitude coordinates of the AP 110 provided as the wireless LAN information, and the distance between the AP 110 and the NodeB 200 is calculated by using the latitude and longitude coordinates of the AP 110 provided as the wireless LAN information, and the latitude and longitude coordinates of the NodeB 200 provided as the wireless environment information.

The positioning server 150 determines whether or not the pieces of the AP information included in the positioning information and the wireless LAN information, for example, the MAC addresses, are matched with each other. When they match, the positioning server 150 compares whether or not the distance between the mobile communication terminal 100 and the AP 110, or the distance between the AP 110 and the NodeB 200, is greater than or equal to the comparative value stored in the memory unit 311. When the distance is greater than or equal to the comparative value, the positioning server 150 may control the WLAN server 180 to delete the AP information of the corresponding AP 110 from the wireless LAN information (S705).

Although exemplary aspects of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

INDUSTRIAL APPLICABILITY

As described above, the present disclosure is highly useful for application in the fields of a positioning apparatus of a mobile communication terminal, a method for establishing the wireless LAN information of the apparatus, a positioning server of the mobile communication terminal, and a method for driving the server. Wireless LAN information prestored in a wireless LAN server is updated on stationary access point basis by using positioning information provided at the request of positioning the mobile communication terminal, and the wireless LAN information is used for the positioning of the mobile communication terminal. Therefore, positioning error can be prevented from occurring by a transportable access point. This improves the accuracy of the positioning and the resultant reliability.

CROSS-REFERENCE TO RELATED APPLICATION

If applicable, this application claims priority under 35 U.S.C §119(a) of Patent Application No. 10-2010-0066171, filed on Jul. 9, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. A system, comprising:

a node information-based server configured to store wireless environment information of a node in charge of communications of a mobile communication terminal, wherein the wireless environment information comprises latitude and longitude coordinates of the node;

a wireless LAN server configured to store wireless LAN information of a plurality of access points, wherein the wireless LAN information comprises latitude and longitude coordinates of the plurality of access points; and a positioning server configured to:

request positioning information of the mobile communication terminal and receive the positioning information of the mobile communication terminal from the mobile communication terminal, wherein the positioning information comprises information of an access point among the plurality of access points, said access point performing wireless LAN communication with the mobile communication terminal, request the wireless environment information of the node and receive the wireless environment information of the node from the node information-based server, request the wireless LAN information of the access point and receive the wireless LAN information of the access point from the wireless LAN server, calculate a distance between the access point and the node, based on the wireless LAN information of the access point, and the wireless environment information of the node, determine whether the access point has moved by comparing the calculated distance with a predetermined distance, and request the wireless LAN server to delete the wireless LAN information of the access point from the wireless LAN server when the calculated distance is greater than or equal to the predetermined distance, wherein the positioning server is configured to calculate the distance between the access point and the node by comparing the latitude and longitude coordinates of the node with the latitude and longitude coordinates of the access point.

2. The system of claim 1, wherein the node information-based server includes an Integrated LBS Indoor Solution (ILIS) server and/or a device management server, wherein the positioning information includes node information, wherein the positioning server is configured to calculate the distance between the access point and the node by using the latitude and longitude coordinates of the node provided by the ILIS server when the positioning information includes n or more pieces of node information, and wherein the positioning server is configured to calculate the distance between the access point and the node by using the latitude and longitude coordinates of the node provided from the device management server when the positioning information includes less than n pieces of node information.

3. The system of claim 2, wherein the value of n is 3, and the n or more pieces of the node information include information on at least one neighboring node.

4. The system of claim 1, wherein the predetermined distance is a maximum communication range of the node in charge of the communications of the mobile communication terminal.

5. A positioning server, comprising:
a memory unit configured to store:
  wireless LAN information of a plurality of access points configured to perform local wireless LAN communications with a mobile communication terminal,
  wireless environment information of a node in charge of communications of the mobile communication terminal,
  positioning information received from the mobile communication terminal, wherein the positioning information comprises information of an access point among the plurality of access points, said access point performing wireless LAN communication with the mobile communication terminal, and
  a comparative value;
a calculation unit configured to calculate
  a distance between the access point and the node, based on the wireless LAN information of the access point and the wireless environment information of the node; and
a mobility determination unit configured to:
  determine whether or not pieces of information of the access point respectively included in the positioning information and the wireless LAN information are matched with each other,
  compare, when the pieces of information of the access point respectively included in the positioning information and the wireless LAN information are matched with each other, the calculated distance with the comparative value, and
  delete the wireless LAN information of the access point from the memory unit when the calculated distance is greater than or equal to the comparative value,
wherein
  the wireless LAN information comprises latitude and longitude coordinates of the access point,
  the wireless environment information comprises latitude and longitude coordinates of the node, and
  the calculation unit is configured to calculate the distance between the access point and the node by comparing the latitude and longitude coordinates of the node and the latitude and longitude coordinates of the access point.

6. The positioning server of claim 5, wherein the comparative value is a maximum communication range of the node in charge of the communications of the mobile communication terminal.

7. A method for establishing, by a positioning server, wireless LAN information of a plurality of access points, the method comprising:
  collecting wireless LAN information of the plurality of access points for performing local wireless LAN communications with a mobile communication terminal, and storing the collected wireless LAN information in a database;
  requesting the mobile communication terminal to perform positioning, and receiving positioning information of the mobile communication terminal from the mobile communication terminal, wherein the positioning information comprises information of an access point among the plurality of access points, said access point performing wireless LAN communication with the mobile communication terminal;
  requesting wireless environment information of a node in charge of communications of the mobile communication terminal, and receiving the wireless environment information;
  determining whether wireless LAN information of the access point is included in the collected wireless LAN information of the plurality of access points;
  when the wireless LAN information of the access point is included in the collected wireless LAN information of the plurality of access points, calculating a distance between the node and the access point, based on the wireless LAN information of the access point, and the wireless environment information of the node;
  determining whether the calculated distance is greater than or equal to a predetermined distance; and
  deleting the wireless LAN information of the access point stored in the database from the database when the calculated distance is determined to be greater than or equal to the predetermined distance,
wherein
  the wireless LAN information comprises latitude and longitude coordinates of the access point,
  the wireless environment information comprises latitude and longitude coordinates of the node, and
  the calculation unit is configured to calculate the distance between the access point and the node by comparing the latitude and longitude coordinates of the node and the latitude and longitude coordinates of the access point.

8. The method of claim 7, wherein said determining whether wireless LAN information of the access point is included comprises comparing MAC addresses of the access points included in the collected wireless LAN information with a MAC address of the access point.

9. The method of claim 7, wherein the predetermined distance is a maximum possible communication range of the node performing communication with the mobile communication terminal.

* * * * *